J. Wood.
Revolving Rake.
N° 59113. Patented Oct. 23, 1866.
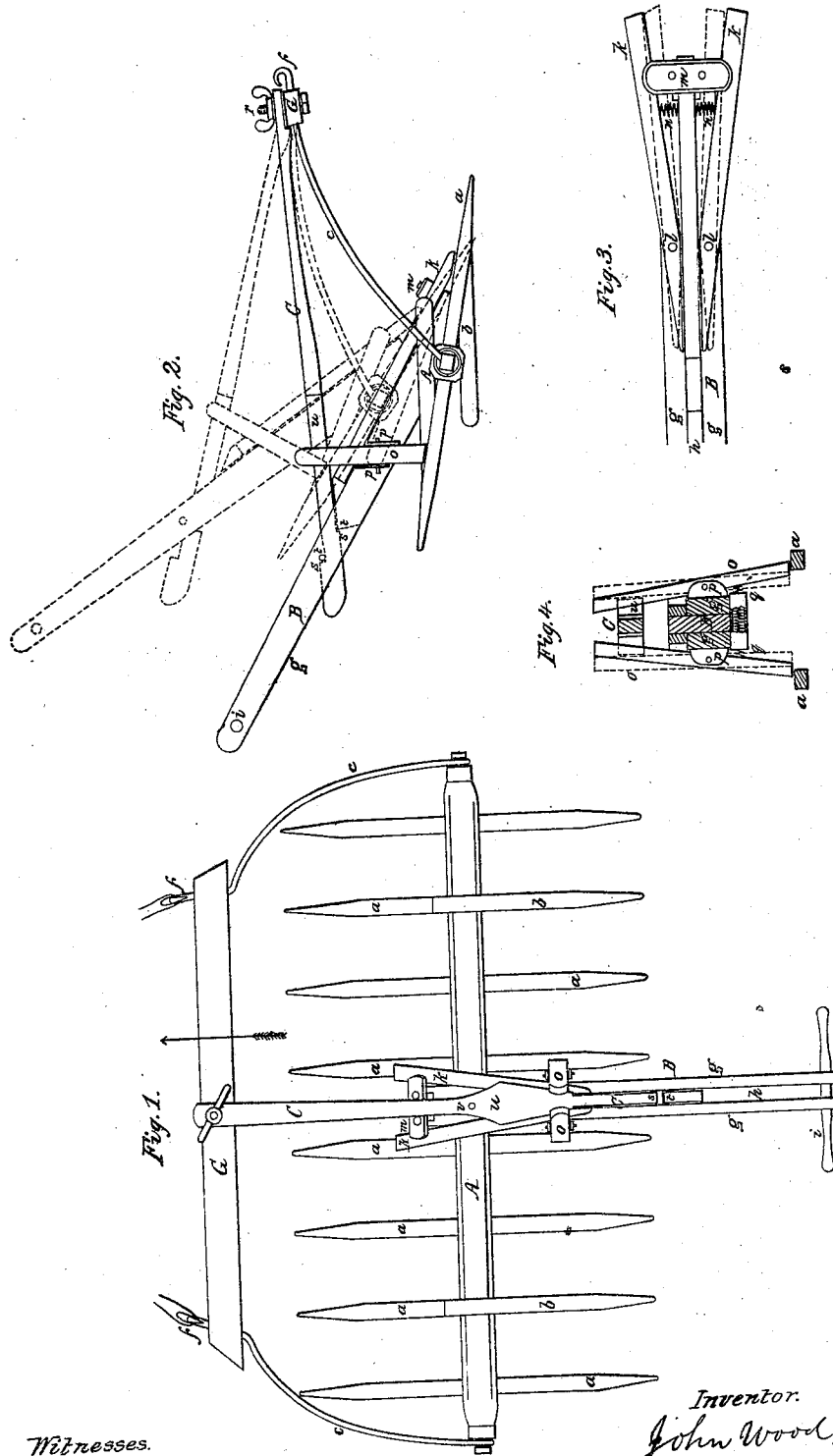
Witnesses.
Jay Hyatt
D. L. Rokard
Inventor.
John Wood.
By J. Fraser & Co.
Atty.

UNITED STATES PATENT OFFICE.

JOHN WOOD, OF NORTH BLOOMFIELD, NEW YORK.

IMPROVEMENT IN HORSE-RAKES.

Specification forming part of Letters Patent No. 59,113, dated October 23, 1866.

*To all whom it may concern:*

Be it known that, JOHN WOOD, of North Bloomfield, in the county of Ontario and State of New York, have invented a new and useful Improvement in Horse Hay-Rakes; and I do hereby declare that the following is a full and exact description thereof, reference being had to the accompanying drawings, making part of this specification.

Figure 1 is a plan of my improved rake; Fig. 2, a side elevation thereof; Fig. 3, a plan of the front spring-stops to hold the rake-head in place; Fig. 4, an elevation of the rear spring-stops.

Like letters of reference indicate corresponding parts in all the figures.

My improvement belongs to that class of rakes in which the head rests upon the ground and half revolves at crossing each windrow.

The invention consists in the special arrangement of the front and rear stops, and the wedge-shaped bar used in connection therewith, when combined with a single handle.

As represented in the drawings, A is the ordinary rake-head, having teeth $a\ a$ and shoes $b\ b$. With each end of the head is jointed a draft-rod, $c$, curving upward and forward, so as to be elevated sufficiently to allow the hay to enter freely upon the teeth. The ends of these rods pass through a cross-bar, G, and form hooks $f\ f$, to which the traces of the harness are secured, as clearly shown.

To the center of the rake-head is jointed a single handle, B, which is made of side pieces, $g\ g$, with a slot, $h$, between them at the upper end, and provided with cross-head $i$.

On top of the lower end of the handle are pivoted, at $l\ l$, two stops, $k\ k$, made simply of wood. These stops are situated in the angular position shown, are held down by a suitable cap, $m$, and are pressed out laterally to hold over the edges of the two middle teeth by means of springs $n\ n$, as most clearly represented in Fig. 3.

At a suitable position in the rear of the rake-head two upright wooden stops, $o\ o$, are pivoted by lugs $p\ p$ to the sides of the handle, and made to rest over the edges of the two middle rear teeth by a spring or springs, $q$, as shown clearly in Figs. 1 and 4.

To the center of the cross-bar G is secured, by a suitable screw, $r$, a longitudinal bar, C, which extends back, and has its rear end flattened and entering the slot $h$, in which it slides freely, but is retained by means of notches $s\ s$, formed thereon, engaging with shoulders $t\ t$ of the handle. Just in front of the upright stops $o\ o$, and passing between the same, the bar C is provided with a double wedge, $u$, of the shape shown in Fig. 1. The bar C is removable by detaching it in front and drawing it out of the rear slot vertically.

The operation will be readily understood. In crossing a windrow the operator throws the handle upward and forward into the position indicated by the red lines in Fig. 2. This action of course slides the ends of the upright stops $o\ o$ forward upon the double wedge $u$, and contracts the lower ends of said stops sufficiently to free them from the teeth of the rake, which then turns.

In turning the two middle teeth strike the inclined sides of the front stops, $k\ k$, and compress them sufficiently to pass, when the stops again strike over the teeth to hold them from reaction. At the same moment the operator depresses the handle, thereby freeing the rear stops, which again expand to catch the rear teeth.

By this construction I am enabled to secure the advantages of a single handle for operating the rake with a simple arrangement of the stops for controlling the head. Single handles have before been employed; but, so far as I am aware, the stops or pawls are unlike mine, and have been usually made of iron and connected or inclosed in such a manner as not only to be not readily accessible for clearing, but to be difficult to repair if broken. I make the stops, as well as the other main working parts, entirely of wood, so that if broken or injured they are easily repaired by the operator himself without the necessity of going to a blacksmith's shop.

The employment of the wedge $u$ in connection with the rear stops is such as to insure the perfect working of the latter in releasing the teeth on which they hold, and the action of the head in turning forward to compress the front stops has a tendency to sweep off the hay that catches thereon.

Where the ordinary enlarged handle is employed, having a double bearing upon the head, the tendency is to clog with hay, and the operation is difficult. In such cases, also, the arrangement of the stops is necessarily complicated. I claim only the special arrangement of these parts in connection with the single handle, whereby not only is the construction very simple, but the parts are so connected as to be easily reached.

In transportation or storage, by simply removing the longitudinal bar C from place, and attaching it by means of the hole $v$ and screw $r$ on top of the draft-bar G, and then swinging these parts around upon the handle, the whole occupies a very compact form, much more so than in any rake with a double handle with which I am acquainted.

In ordinary arrangements where double handles are employed, the draft is simply connected with the frame of said handles, which is very objectionable; and where single handles have been employed the traces have been connected with the ends of the rake in such a manner as to seriously interfere with the hay entering upon the teeth. It will be seen that I obviate these difficulties by the employment of the curved draft-rods $c\ c$, connected with the ends of the head, and rising so high as to be out of the way of the hay, and connected by the cross-bar G to give suitable stiffness and direction.

What I claim as my invention, and desire to secure by Letters Patent, is—

The special arrangement of the spring-stops $k\ k$ and $o\ o$ and the bar C, provided with the double wedge $u$, when said parts are used in combination with the single handle B, for controlling the rake-head, operating as and for the purpose herein set forth.

In witness whereof I have hereunto signed my name in the presence of two subscribing witnesses.

JOHN WOOD.

Witnesses:
C. G. LLOYD,
R. C. YOWELL.